United States Patent
Iwashita

[11] Patent Number: 6,057,661
[45] Date of Patent: *May 2, 2000

[54] METHOD OF DETECTING AN ABNORMAL LOAD ON A SERVOMOTOR AND CONTROLLING THE SAME IN SUCH AN ABNORMAL CONDITION

[75] Inventor: Yasusuke Iwashita, Oshino-mura, Japan

[73] Assignee: Fanuc Ltd., Yamanashi, Japan

[ * ] Notice: Under 35 U.S.C. 154(b), the term of this patent shall be extended for 560 days.

[21] Appl. No.: 08/764,508

[22] Filed: Dec. 12, 1996

Related U.S. Application Data

[63] Continuation of application No. 08/313,279, filed as application No. PCT/JP94/00150, Feb. 2, 1994, abandoned.

[30] Foreign Application Priority Data

Feb. 10, 1993 [JP] Japan .................................... 5-045751

[51] Int. Cl.[7] .............................. G05B 9/02; G05B 19/29
[52] U.S. Cl. .................... 318/563; 318/566; 318/568.24; 318/603; 318/280; 318/469
[58] Field of Search ....................... 318/565, 560–568.25, 318/599, 603, 466–469, 280–282; 700/174, 177, 178

[56] References Cited

U.S. PATENT DOCUMENTS

| | | | |
|---|---|---|---|
| 4,383,206 | 5/1983 | Matsuoka et al. ...................... | 318/445 |
| 4,580,085 | 4/1986 | Eto et al. ................................. | 318/565 |
| 4,675,586 | 6/1987 | Eigner et al. ............................ | 318/458 |
| 4,682,089 | 7/1987 | Tamari ................................. | 318/563 X |
| 4,795,955 | 1/1989 | Yamashita ............................... | 318/632 |
| 4,864,208 | 9/1989 | Schroder ................................. | 318/603 |
| 4,933,800 | 6/1990 | Yang . | |
| 5,218,282 | 6/1993 | Duhame ................................. | 318/603 |
| 5,304,906 | 4/1994 | Arita et al. ......................... | 318/518.16 |
| 5,418,440 | 5/1995 | Sakaguchi et al. ..................... | 318/560 |

FOREIGN PATENT DOCUMENTS

| | | |
|---|---|---|
| 0 059 541 | 9/1982 | European Pat. Off. . |
| 0 224 589 | 6/1987 | European Pat. Off. . |
| 0 464 211 | 1/1992 | European Pat. Off. . |

*Primary Examiner*—Brian Sircus
*Attorney, Agent, or Firm*—Fanuc Ltd.

[57] ABSTRACT

A method of detecting an abnormal load and controlling a servomotor in such an abnormal condition. The servomotor is controlled so that a load will not continuously act on a machine after the abnormal load is detected. When a load torque, detected by an observer, exceeds a reference value, a flag F1 is set to "1". In the next processing cycle, the flag F1 is "1" and a flag F2 is "0", so that a positional deviation A, having a direction opposite to the driving direction, is set in the error register, and the flag F2 is set to "1". In the succeeding processing cycles, a position feedback amount $\theta$ is subtracted from the error register to obtain a positional deviation, and the obtained positional deviation is used to execute a position and speed loop processing. The servomotor rotates in the opposite direction until the positional deviation A is reduced to "0" before it stops.

3 Claims, 3 Drawing Sheets

METHOD OF DETECTING AN ABNORMAL LOAD ON A SERVOMOTOR AND CONTROLLING THE SAME IN SUCH AN ABNORMAL CONDITION

This application is a continuation of application Ser. No. 08/313,279, filed Oct. 5, 1994, now abandoned filed as PCT/JP94/00150, Feb. 2, 1994.

BACKGROUND OF THE INVENTION

1. Field of the Invention

This invention relates to a method of detecting an abnormal load acting on a servomotor which drives a cutter of a machine tool or a robot arm, and of controlling the servomotor when such abnormal load is detected.

2. Description of the Related Art

In a machine tool or a robot using a servomotor as a drive source, when a movable element of the machine tool such as a cutter or a table, or a robot arm collide with an obstacle, such a collision causes the servomotor to develop a large torque as it continues to drive the movable element of the machine tool or the robot arm in response to a given move command. Hence, the movable element of the machine tool or the robot arm is subjected to an abnormally large force which may damage the driving mechanism including the servomotor. To prevent such a damage, there is known a method including detecting an abnormal load acting on the servomotor, determining an occurrence of collision when an abnormal load is detected, and stopping the motor in such abnormal load condition. In the International Publication WO91/10181, there is proposed a method of estimating a disturbance torque using a disturbance estimating observer, and detecting an abnormal load by comparing the estimated disturbance torque with a predetermined set value.

According to the above conventional method, when an abnormal load is detected, the speed command is set to "0", thereby stopping the servomotor immediately.

However, when abnormal load is detected, the motor is already affected by the disturbance load. Since the machine has elastically deformable components, even when the motor has stopped immediately in response to the detection of the abnormal load, the motor causes the machine to be kept depressed or the machine to be kept elastically deformed, thereby causing the machine to be continuously subjected to the load and the resulting damages to the tools and machine components.

SUMMARY OF THE INVENTION

The object of the present inventions is to control the servomotor so that the motor is not affected by the load when the abnormal load on the motor is detected, thereby preventing the tools and machine components from being damaged.

The method of detecting an abnormal load on a servomotor according to the present invention comprises the steps of detecting an abnormal load acting on a servomotor during drive operation of the servomotor, and stopping the servomotor after rotating the motor for a predetermined angle towards the reverse direction to the present direction of rotation.

According to the method of the present invention, a disturbance estimating observer estimates a disturbance torque acting on the servomotor and an abnormal load is detected when the estimated disturbance torque exceeds a reference value. Furthermore, when the abnormal load is detected, a predetermined positional deviation having a direction opposed to the present advancing direction is set in an error register used for position loop processing. This enables the servomotor to be driven to reduce the previously set positional deviation to "0", thus causing the servomotor to stop after being rotated for a predetermined angle towards the direction reverse to the direction at the time when the abnormal load is detected.

DETAILED DESCRIPTION OF THE PREFERRED EMBODIMENTS

Figure 1:
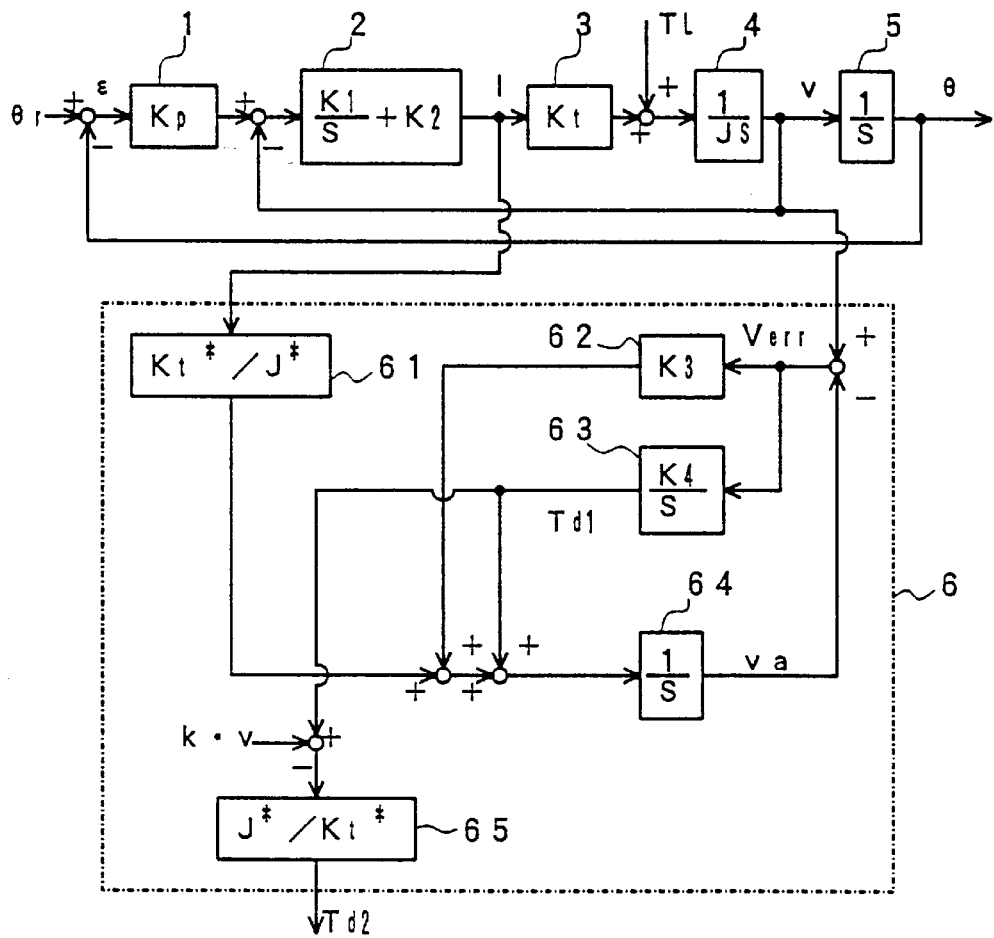
FIG. 1 is a block diagram showing a servo system including position and speed control loops and an observer embodying the present invention.

FIG. 1 shows a servomotor control system for a machine tool, robot, etc. applying a proportional control (P control) to the position control and a proportional-plus-integral control (PI control) to the speed control, which is capable of estimating the disturbance torque using an observer and detecting a collision, etc.

An element 1 represents a proportional gain Kp used in the position loop and an element 2 represents a transfer function used in the speed loop, where K1 is an integral constant and K2 is a proportional constant. Elements 3 and 4 represent transfer functions of the motor, where Kt is a torque constant and J is an inertia. An element 5 represents a transfer function which integrates the speed v to calculate the position e. Furthermore, TL represents a disturbance torque, and S a Laplace operator.

Subtracting a feedback value of the present position θ from the position command θr gives a positional deviation ϵ (=θr−θ). Multiplying the obtained positional deviation ϵ by the proportional constant Kp gives a speed command Vcmd. Executing a PI control based on a difference (i.e. speed deviation) between the obtained speed command Vcmd and an actual speed v gives a torque command (current command) I. The torque command I is used to control a motor current, by which the motor is driven. The motor rotates at the speed v, and the position θ is obtained by integrating the speed v.

The disturbance estimating observer 6 is incorporated into this servomotor control system in order to estimate the disturbance torque as shown in FIG. 1.

K3 in the element 62 and K4 in element 64 are the parameter values of the disturbance estimating observer 6 respectively. An element 61 represents a parameter value to be multiplied by the current value I as a torque command, which is actually outputted to the servomotor. In the element 61, Kt* is an estimated value of motor torque constant, and J* is an estimated value of inertia. A reference numeral 64 represents an integral element.

Thus, the element 61 multiplies the current command I, outputted through the speed loop processing, by a value obtained by dividing the estimated value Kt* of the motor torque constant by the estimated value J* of the inertia. The element 62 multiples the constant K3 by a deviation Verr obtained by subtracting the estimated motor speed Va from the detected actual motor speed v. The element 63 multiplies the constant K4 by an integrated value of the deviation Verr. Outputs of these elements 61, 62 and 63 are added and this added value is then integrated in an element 64 to obtain the estimated motor speed va.

In the above processing, an output of the element 63 represents an estimated overall disturbance torque Td1 acting on the motor. In the disturbance estimating observer 6 shown in FIG. 1, a frictional torque component (k·v) proportional to the speed is subtracted from the estimated overall disturbance torque Td1, and then the difference is multiplied by a parameter J*/Kt* in an element 65, thus obtaining a disturbance estimation value Td2 for detection of collision. As described later, when this disturbance estimation value Td2 has exceeded the reference value, it is judged that an abnormal load has occurred.

Detailed analysis and processing of the disturbance estimating observer is described in the International Publication WO91/10181 and Japanese Patent Application No. 4-306233 and others; therefore, detailed explanation will be omitted here.

Figure 2:
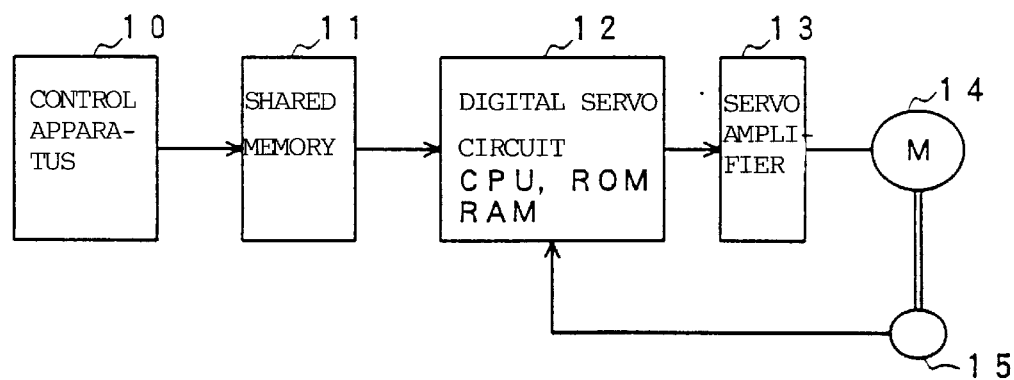
FIG. 2 is a block diagram showing a servo control apparatus embodying the present invention.

FIG. 2 is a block diagram showing essential components of a servo control apparatus embodying the method of the present invention. A numerical control apparatus 10, controlling a machine tool or a robot, generates shift commands and various control signals, which are supplied through a shared memory 11 to a digital servo circuit 12. The digital servo circuit 12, including a processor (CPU), a ROM and a RAM, executes digital position and speed loop processing, and controls the servomotor 14 of each axis, through a servo amplifier 13, constituted of transistor invertors and others. A position/speed detector 15, detecting position and speed, is constituted of a pulse coder or the like which is attached to the motor shaft of the servomotor, and outputs the feedback signals of position and speed to the digital servo circuit 12. Although FIG. 2 shows only a servo system of one axis, the same servo system is provided for each of remaining axes. The constitution of such a servo system is identical with that of a conventional digital servo circuit.

Figure 3:
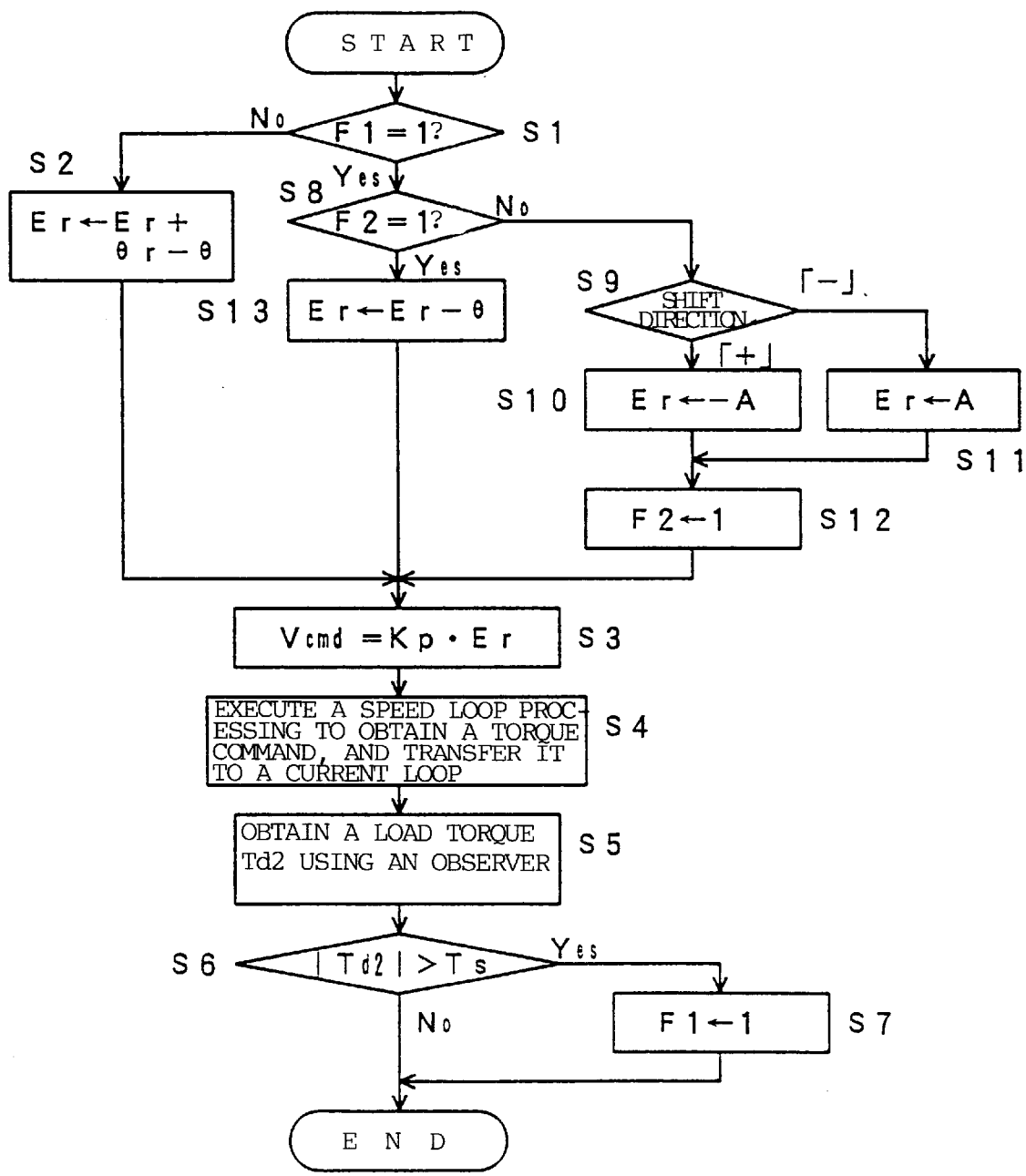
FIG. 3 is a flowchart showing a processing to be executed by a processor in the digital servo circuit of FIG. 2 in accordance with the method of the present invention.

Hereinafter, with reference to the flowchart of FIG. 3, the processing, to be executed in each position and speed loop processing cycle by the processor of the digital servo circuit 3, will be explained.

The digital servo circuit 12 sets therein, in advance, the constants K3 and K4 constituting the observer, the estimated value Kt* of torque constant, the estimated inertial value J*, the coefficient k of estimated frictional torque, the reference value Ts for detection of abnormal load, and a return amount A in the event of the detection of abnormal load.

The processor in the digital servo circuit first makes a judgement, in step S1, as to whether a flag F1 is "1" or not. The flag F1 is a flag to indicate the detection of an abnormal load, being set to "0" in the initial setting, and set to "1" when the abnormal load is detected in a step S7 as described later.

When the flag F1 is not "1", the processor proceeds to step S2 to read a shift command generated through the shared memory 11 from the numerical control apparatus 10 in each distribution cycle in the same manner as in a conventional system. The position feedback value e from the position/speed detector 15 is subtracted from a move command θr which is divided for each position and speed loop processing cycle by DDA processing or the like, and the obtained value is added to an error register Er for storing positional deviation, thereby obtaining a new positional deviation.

Then, in a step S3, the positional deviation stored in the error register Er is multiplied by the position loop gain Kp to obtain the speed command Vcmd. In step S4, thus obtained speed command Vcmd and the speed feedback value detected by the position/speed detector 15 undergo the speed loop processing to obtain the torque command I, which is then transferred to the current loop. The current loop executes a current loop processing in response to the torque command I to drive the servomotor.

Next, in step S5, the processor executes the processing of the disturbance estimating observer 6 shown by the block diagram of FIG. 1, thus obtaining the estimated disturbance torque Td2, from which the frictional torque has been removed. In step S6, a judgement is made as to whether the absolute value of the estimated disturbance torque Td2 obtained in the step S5 exceeds the predetermined reference value Ts being set for detecting abnormal load. When the absolute value of the estimated disturbance torque Td2 does not yet exceed the reference value Ts, the load is regarded as normal, and the processing of the current position and speed loop processing cycle is finished. In other words, as long as any abnormal load is not detected, and therefore the flag F1 remains set to "0", the processings of steps S1 to S6 are repeated in every position and speed loop processing cycle.

When it is judged in the step S6 that the absolute value of the estimated disturbance torque Td2 exceeds the reference value Ts, the processor proceeds to step S7 and sets the flag F1 to "1".

In the next processing cycle, the flag F1 of the value "1" is detected through the processing of step 1. Hence, the processor proceeds to step S8 and judges whether a flag F2 is set to "1". The flag F2 indicates whether or not the current processing cycle is the first cycle immediately after the detection of the abnormal load. The flag F2 is set to "0" in the initial setting for starting the operation of the machine. Thus, when it is judged that F1=1 in step 1 first after the start of processing it is certain that F2=0, and so the processor proceeds to step S9 from Step S8. In the step S9, a judgement is made as to the present shifting direction (i.e. a rotational direction) of the servomotor. The shifting direction is judged based on the polarity of the shift command θ given to the servomotor. When the shifting direction is plus, the processor proceeds to a step S10, wherein the error register Er is set to "−A", i.e. a minus value having the magnitude of A being set as a return amount of the servomotor. On the other hand, when the shifting direction is minus, the processor proceeds to step S11, wherein the error register Er is set to a positive value "A". Thereafter, the flag F2 is set to "1" in step S12, and subsequently the processings in and after the step S3 are executed.

As the result of the above-described processings, the error register Er stores the positional deviation whose direction is opposite to the present advancing direction (i.e. a positional deviation of opposite polarity); therefore, the speed command Vcmd obtained in the step S3 becomes a speed command having a direction opposite to the present advancing direction. Hence, the torque command I obtained in the step S4 has the opposite direction, resulting in that the servomotor rotates in a direction opposite to the present rotating direction. As the flags F1 and F2 are both set to "1" in the next processing cycle, the processor proceeds from the step S1 to the step S8, and then from the step S8 to a step S13, wherein the position feedback value 0 is subtracted from the error register Er to obtain a new positional deviation, and the processor executes the processings in and after the step 3. After that, the processings of the steps S1, S8, S13, S3 to S6, and S7 are executed in each processing cycle. When the positional deviation stored in the error register Er becomes "0", i.e. when the servomotor has rotated in the direction opposite to the present direction of rotation by a rotational amount equivalent to the set value A, the servomotor is stopped.

Further, the processings of the steps S5 to S7 are not necessary in each processing cycle after an abnormal load is once detected, and so when the flag F1 or F2 is set to "1", the processings of steps S5 to S7 may be omitted.

As explained above, when an abnormal load is detected, the servomotor is stopped after making a predetermined amount of reverse rotation. Therefore, even when the machine is elastically deformed due to collision or the like, such an elastic deformation is released by the reverse rotation the servomotor, thus enabling the machine and the servomotor to stop in a condition free from the effect of the abnormal load.

Figure 4:
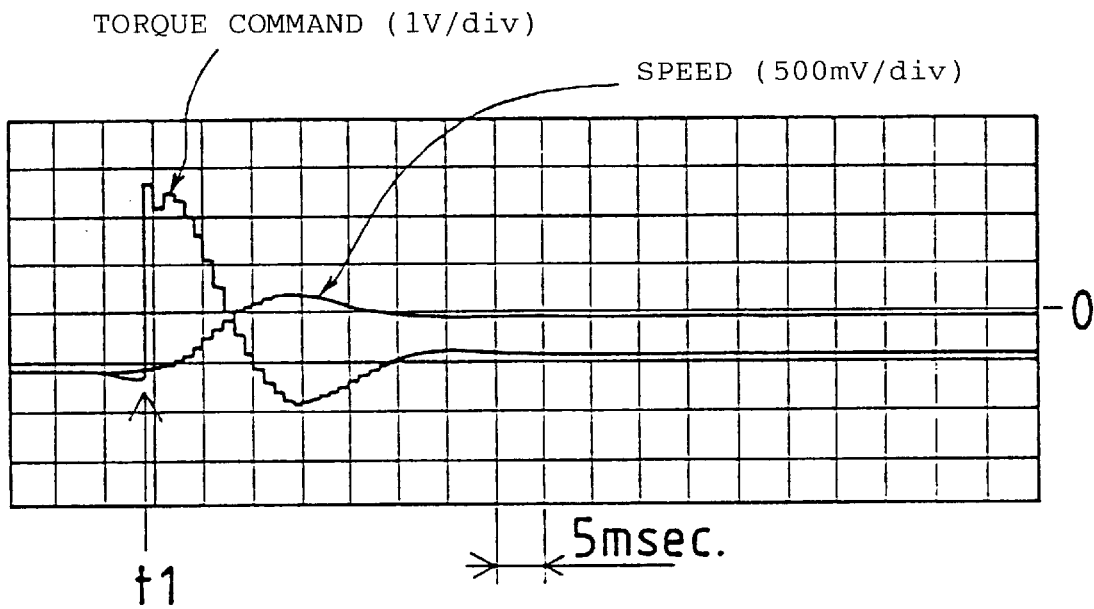
FIG. 4 is a graph showing the results of experiments based on a conventional servomotor control method applied to the case of abnormal load detection.
Figure 5:
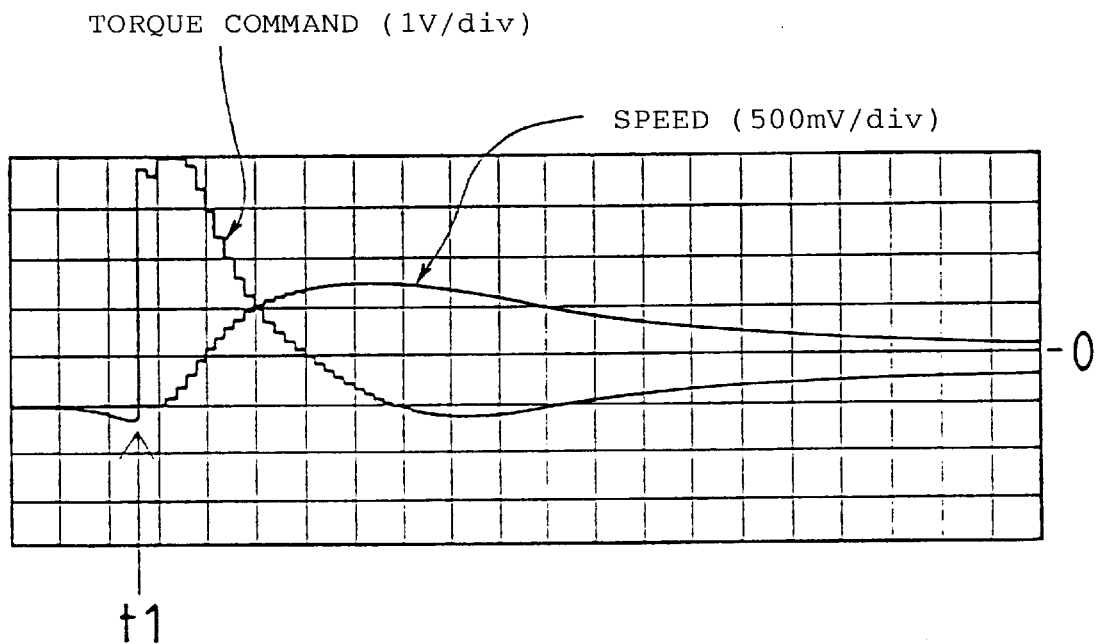
FIG. 5 is a graph showing the results of experiments according to the method of the present invention.

FIGS. 4 and 5 show comparative experimental data of the conventional system and the system according to the present invention. FIG. 4 shows the experimental data obtained according to the conventional method, in which a servomotor is stopped in response to detection of abnormal load using an observer, while FIG. 5 shows the experimental data obtained according to the method of the present invention.

In the conventional example of FIG. 4, when an abnormal load is detected at the time t1, a large torque in reverse direction (braking torque) is developed, and the torque in normal direction (direction at the time of collision) remains even after the speed of the servomotor has become "0". This indicates that the movable parts of a machine driven by the servomotor is stopped with an external force acting thereon.

Meanwhile, according to the method of the present invention shown in FIG. 5, when abnormal load is detected at t1, a torque is generated in such a manner that the servomotor is rotated in the opposite direction, causing the polarity of the speed to be reversed, and the torque generated by the servomotor converges to "0". This prevents the movable portion of a machine driven by the servomotor from being stopped against any force acting thereon, thus protecting an object such as a machine or a workpiece.

As explained in the foregoing description, the present invention releases the movable portion or driving mechanism of a machine driven by a servomotor from being left subjected to a force caused by an abnormal load still after it is detected. As a result, it becomes possible for the mechanical components, tools, and further obstacles from being damaged.

I claim:

1. A method of detecting an abnormal load on a servomotor driving a machine and controlling the servomotor in such an abnormal condition, comprising the steps of:

(a) rotating a servomotor in a first direction to drive a machine tool;

(b) detecting an abnormal load acting on the servomotor during a driver operation and due to a large torque developed by the rotation of said servomotor in said first direction when an obstacle collides with said machine tool causing an elastic deformation on said machine tool;

(c) executing a position loop processing using an error register for storing a positional deviation value;

(d) setting a predetermined positional deviation having a direction opposite to said first direction in said error register when said abnormal load is detected; and (e) rotating the servomotor in the direction opposite to the first direction by a predetermined rotational amount corresponding to said predetermined positional deviation and then stopping the servomotor, to release said elastic deformation of said machine tool.

2. A method of detecting an abnormal load on a servomotor and controlling the servomotor in such an abnormal condition in accordance with claim 1, wherein said step (b) includes the steps of estimating a disturbance torque applied to the servomotor using an observer, and detecting the abnormal load when the estimated disturbance torque exceeds a reference value.

3. A method of detecting an abnormal load on a servomotor driving a machine and controlling the servomotor in such an abnormal condition, comprising the steps of:

(a) executing a position loop processing;

(b) storing a positional deviation value based on the position loop processing in an error register;

(c) driving and controlling a servomotor to rotate in a first direction based on the stored positional deviation, to drive a machine tool;

(d) estimating a disturbance torque applied to the servomotor using an observer during the driving and controlling of the servomotor driving the machine tool;

(e) determining an existence of the abnormal load when the disturbance torque estimated in step (d) exceeds a reference value due to a large torque developed bv the rotation of said servomotor in said first direction when an obstacle collides with said machine tool causing an elastic deformation on said machine tool;

(f) setting a predetermined positional deviation having a direction opposite to the first direction in said error register, when the abnormal load is determined in said step (e); and (g) rotating the servomotor in the opposite direction by a rotational amount corresponding to said predetermined positional deviation and then stopping the servomotor, to release said elastic deformation of the machine tool.

* * * * *